Patented June 2, 1925.

1,540,444

UNITED STATES PATENT OFFICE.

GLENN H. WILLIS, OF AKRON, OHIO, ASSIGNOR, BY DIRECT AND MESNE ASSIGNMENTS, OF ONE-THIRD TO FRANK LAHEY, OF AKRON, OHIO, AND ONE-THIRD TO V. V. MESSER MANUFACTURING COMPANY, INC., OF LONG ISLAND CITY, NEW YORK, A CORPORATION OF NEW YORK.

MATRIX-FORMING PROCESS.

No Drawing. Application filed October 3, 1923. Serial No. 666,397.

*To all whom it may concern:*

Be it known that I, GLENN H. WILLIS, a citizen of the United States, residing in Akron, county of Summit, State of Ohio, have invented certain new and useful Improvements in Matrix-Forming Processes, of which the following is a specification.

This invention relates to a process of forming matrices from plastic self-hardening materials and has for its object to produce matrices of a higher degree of refinement with respect to their capacity for impressing delicately defined patterns than have heretofore been produced by present well known methods. Toward the attainment of this end, my invention contemplates the utilization of that property in certain well known compounds in virtue of which they expand during a curing operation or under heat treatment while at the same time being in a fluid or semi-fluid condition. During such a treatment, the material is rendered more susceptible of receiving delicate impressions under the expansive force within the material itself.

According to present well known methods of forming molds from hard rubber and other self-hardening plastic compounds, it is customary to employ external pressure to force the pattern-carrying model or article to be reproduced down into the plastic compound in its molten or semi-molten condition, thus forming the desired mold. The objection to this procedure is that it is not adapted to reproduce the intricacies of such delicate designs as are found in fine laces, weaves, or such as those found in the soft pile or nap on tapestries, carpets, etc. This is so for the reason that by the use of direct or external pressure for sinking the model or pattern into the plastic material, the design becomes distorted or destroyed, so that a true or exact impression cannot be secured in the finished mold.

In the practical application of my invention, I preferably employ a rubber mixture altho other self-hardening plastic compounds may be employed in a similar manner without departing from the broad spirit of my invention. Thus, I prefer to use a hard sponge rubber compound or mold material that becomes very soft and plastic upon the application of heat but which cures or vulcanizes hard. A sponge rubber compound is a rubber mixture of rubber, sulphur, magnesium carbonate, metal salts such as zinc oxide, a gas producing material or substance of which there are many to be employed (and which are well known to those versed in the art) and a fluxing agent or softening material such as oils, greases, waxes, etc. After the mixing of the sponge rubber material, which can be carried out in the usual manner, it is sheeted out to any convenient thickness. The length and breadth, of course, depends on the article to be reproduced. The following is a recipe I prefer to use, altho I do not confine myself to this mixture, as other sponge compounds may be used if the sulphur and other curing agents are in the right proportions to cause the mass to cure hard.

| | Lbs. | Oz. |
|---|---|---|
| Smoked sheet | 17 | 8 |
| Caucho ball | 5 | |
| Mineral rubber | 6 | |
| Cotton or wool flox | 4 | |
| Paragol | 2 | |
| Petrolatum | 1 | 4 |
| Zinc oxide | 2 | 8 |
| Lime | 3 | |
| Litharge | 1 | 4 |
| Sulphur | 16 | |
| Ethylidene aniline | 0 | 4 |
| | 58 | 12 |

Toward a better understanding of my invention, the following specific application may be given for the reproduction of a delicate design on a strip of material such as lace. After making the plastic mixture according to the above formula, for example, a portion of such mixture is deposited on a thin plat of sheet metal in the form of a sheet having a thickness about one-half that desired for the finished mold. Said plat of sheet metal is made somewhat larger than the plastic material sheet so as to project therefrom on all sides. Parallel bars having twice the thickness of the sheeted stock of plastic material, are next placed upon the exposed edges of the bottom plat and in contact with the plastic material stock on all four sides thereof. Over the upper surface of the sheeted stock is dusted a 50—50 mixture of powdered soapstone and mica after which the lace model which carries the design to be reproduced is placed in position thereon. Another sheet of metal or of suitable fabric such as duck, drill, etc. is placed on top as a cover after which the whole is placed between heated press platens and held there until the hard sponge rubber compound is completely cured. This may be accomplished in forty-five minutes under a steam pressure of seventy-five pounds and a temperature of three hundred and twenty degrees Fahrenheit. During the first few minutes of the curing process the stock becomes very soft or semi-liquid, at the same time expanding, swelling or rising, carrying the material or article to be reproduced with it until the space within the bars is entirely filled and remains in this state until cure is complete. During this curing and swelling of the mixture, a perfect impression is secured. When the cured mold is taken from the press, the pattern or material that has been used is removed, leaving an exact impression of the original in detail, thus forming a hard mold in or on which the reproduction is made in rubber and allied products, and also phenol condensation products, linoleum, or other products in which this matrix can be applied.

I claim:—

1. The process of forming reproductions, which consists in applying the article to be reproduced to a mass of material which expands during a curing operation, in curing said mass within a confined space to form a matrix having an impression of said article produced therein by pressure due to expansion during the curing operation, and in forming a replica of said article by the use of said matrix after removing said article.

2. The process of forming reproductions, which consists in making an impression matrix of material which expands under an application of heat by confining a mass of said material together with a pattern-forming model within a predetermined space of greater volume than that occupied by the unheated mass, in heating the mass to produce an impression therein by means of the expansion thereof in contact with said model within the confined space, in removing said model, and in forming replicas of said model in said impression matrix.

3. The process of forming reproductions, which consists in molding a matrix of plastic hardening compounds which expand under an application of heat by enclosing within a limited space the object to be reproduced together with a mass of said compound not entirely filling said space, in treating said compound to expand it to completely occupy said space whereby an impression of said object is produced during the expanding treatment, and in forming reproductions of said object by molding bodies of plastic compound in said matrix after removal of said object.

4. The process of making reproductions, which consists in making impression matrices by confining a mass of sponge rubber compound within a limited space with an article to be reproduced, in curing and expanding said compound in a softened condition until said space is completely filled and an impression of said article imparted thereto, and in molding reproductions of said article in the matrix thus produced after removing said article.

GLENN H. WILLIS.